United States Patent
Hsieh et al.

(10) Patent No.: US 9,430,094 B2
(45) Date of Patent: Aug. 30, 2016

(54) OPTICAL TOUCH SYSTEM, METHOD OF TOUCH DETECTION, AND COMPUTER PROGRAM PRODUCT

(71) Applicant: Wistron Corporation, New Taipei (TW)

(72) Inventors: Sheng-Hsien Hsieh, New Taipei (TW); Shang-Chin Su, New Taipei (TW); Hsun-Hao Chang, New Taipei (TW); Kai-Chung Cheng, New Taipei (TW); Shou-Te Wei, New Taipei (TW)

(73) Assignee: Wistron Corporation, New Taipei (TW)

( * ) Notice: Subject to any disclaimer, the term of this patent is extended or adjusted under 35 U.S.C. 154(b) by 329 days.

(21) Appl. No.: 14/203,586

(22) Filed: Mar. 11, 2014

(65) Prior Publication Data

US 2015/0115130 A1    Apr. 30, 2015

(30) Foreign Application Priority Data

Oct. 25, 2013 (TW) .............................. 102138748 A

(51) Int. Cl.
*G06F 3/042* (2006.01)
*G06F 3/038* (2013.01)

(52) U.S. Cl.
CPC .............. *G06F 3/0421* (2013.01); *G06F 3/038* (2013.01); *G06F 3/0425* (2013.01)

(58) Field of Classification Search
CPC .... G06F 3/042; G06F 3/0421; G06F 3/0488; G06F 3/04883
USPC ........................ 250/221, 206.1; 345/173, 175
See application file for complete search history.

(56) References Cited

U.S. PATENT DOCUMENTS

| 7,411,575 | B2* | 8/2008 | Hill .................. G06F 3/0421 345/156 |
| 8,576,200 | B2 | 11/2013 | Zhu et al. |
| 2011/0069037 | A1 | 3/2011 | Su |
| 2013/0234957 | A1* | 9/2013 | Shirato .............. G06F 3/0416 345/173 |

FOREIGN PATENT DOCUMENTS

TW        201203055        1/2012

OTHER PUBLICATIONS

"Office Action of Taiwan Counterpart Application" with partial English translation, issued on Oct. 13, 2015, p. 1-p. 8, in which the listed references were cited.

* cited by examiner

*Primary Examiner* — Kevin Pyo
(74) *Attorney, Agent, or Firm* — Jianq Chyun IP Office

(57) ABSTRACT

An optical touch system is provided. At least one light source is disposed at a side of a base plane. A first optical sensor and a second optical sensor detect a space in front of the base plane to generate a first signal and a second signal. When two groups of objects approach to or touch the base plane, a processing unit determines at least one first portion of the first signal corresponding to the two groups of the objects and at least one second portion of the second signal corresponding to the two groups of the objects, and converts the at least one first portion and the at least one second portion into a plurality of touch regions, and determines group transformations according to positions corresponding to at least part of touch regions. Additionally, a method of touch detection, and a computer program product are also provided.

28 Claims, 12 Drawing Sheets

OPTICAL TOUCH SYSTEM, METHOD OF TOUCH DETECTION, AND COMPUTER PROGRAM PRODUCT

CROSS-REFERENCE TO RELATED APPLICATION

This application claims the priority benefit of Taiwan application serial no. 102138748, filed on Oct. 25, 2013. The entirety of the above-mentioned patent application is hereby incorporated by reference herein and made a part of this specification.

BACKGROUND

1. Technical Field

The disclosure relates to an optical touch system, a method of touch detection and a computer program product.

2. Related Art

In recent years, as a touch electronic product has advantages of easy operation and high operation intuition, it is well received by consumers and becomes a main stream in the market. In conventional resistive, capacitive and rear projection touch screens, the capacitive touch screen has a best touch effect, though the cost thereof is the highest, and along with increase of screen size, application of the capacitive touch screen is limited.

In order to seek an alternative scheme of the capacitive touch screen, an optical touch screen using optical lenses to detect touching positions is developed, and since it has advantages of low cost, high accuracy, etc., it has high competitiveness in the market, and becomes another choice of the large size touch screen.

In another type of the optical touch screen, a plurality of optical lenses or reflective frames are disposed at an edge of the screen to facilitate capturing images of user's finger operated on the screen. The size of the screen in the market becomes larger and larger, and screens with a size of 80 inches have been developed. It is not easy to integrate the touch function to such large screen since regardless of a type of an operating interface, function keys or shortcuts are generally disposed at the edge of the screen, so as to avoid influencing content displayed at the center of the screen. Moreover, since the screen is excessively large, it is inconvenient and time-consuming for the user to perform operations thereon.

SUMMARY

The disclosure is directed to an optical touch system, which is capable of accurately determining a group transformation when two groups of objects approach to or touch a base plane.

The disclosure is directed to a method of touch detection, which is capable of accurately determining a group transformation when two groups of objects approach to or touch a base plane.

The disclosure is directed to a computer program product, which is capable of accurately determining a group transformation when two groups of objects approach to or touch a base plane.

An embodiment of the disclosure provides an optical touch system, which is configured to determine a group transformation when two groups of objects approach to or touch a base plane. The optical touch system includes at least one light source, a first optical sensor, a second optical sensor and a processing unit. The at least one light source is disposed at a side of the base plane and emits a light beam towards the base plane. The first optical sensor is disposed at a side of the base plane, and detects a space in front of the base plane to generate a first signal. The second optical sensor is disposed at a side of the base plane, and detects the space in front of the base plane to generate a second signal, where a position of the first optical sensor is different to a position of the second optical sensor. The processing unit receives the first signal and the second signal, where when the two groups of the objects approach to or touch the base plane, the processing unit determines at least one first portion of the first signal corresponding to the two groups of the objects and at least one second portion of the second signal corresponding to the two groups of the objects. The processing unit converts the at least one first portion and the at least one second portion into a plurality of possible touch regions in a two-dimensional space, and the processing unit determines the group transformation according to positions corresponding to at least a part of the possible touch regions.

An embodiment of the disclosure provides a method of touch detection, which is configured to determine a group transformation when two groups of objects approach to or touch a base plane. The method of touch detection includes following steps. At least one light beam is provided, and the at least one light beam is propagated in front of the base plane. A space in front of the base plane is detected from a first detection position to generate a first signal. The space in front of the base plane is detected from a second detection position to generate a second signal. When the two groups of the objects approach to or touch the base plane, at least one first portion of the first signal corresponding to the two groups of the objects and at least one second portion of the second signal corresponding to the two groups of the objects are determined. The at least one first portion and the at least one second portion are converted into a plurality of possible touch regions in a two-dimensional space, and the group transformation is determined according to positions corresponding to at least a part of the possible touch regions.

An embodiment of the disclosure provides a computer program product, which is stored in a computer readable recording medium for determining a group transformation when two groups of objects approach to or touch a base plane. The computer program product includes a first program instruction, a second program instruction, a third program instruction, a fourth program instruction, a fifth program instruction, and a sixth program instruction. The first program instruction provides at least one light beam, and the at least one light beam is propagated in front of the base plane. The second program instruction detects a space in front of the base plane from a first detection position to generate a first signal. The third program instruction detects the space in front of the base plane from a second detection position to generate a second signal. The fourth program instruction determines at least one first portion of the first signal corresponding to the two groups of the objects and at least one second portion of the second signal corresponding to the two groups of the objects according to a clustering algorithm when the two groups of the objects approach to or touch the base plane. The fifth program instruction converts the at least one first portion and the at least one second portion into a plurality of possible touch regions in a two-dimensional space according to a triangulation, and the sixth program instruction determines the group transformation according to positions corresponding to at least a part of the possible touch regions.

According to the above descriptions, in the optical touch system, the method of touch detection and the computer program product of the embodiment of the disclosure, the first optical sensor and the second optical sensor are configured to detect the space in front of the base plane to generate the first signal and the second signal, and the processing unit determines at least one first portion of the first signal corresponding to the two groups of the objects and at least one second portion of the second signal corresponding to the two groups of the objects, and converts the at least one first portion and the at least one second portion into a plurality of possible touch regions in a two-dimensional space, and the processing unit determines a group transformation according to positions corresponding to at least a part of the possible touch regions, such that different group transformations of the two groups of the objects can activate different functions. In this way, the user can implement required operations at any position in front of the base plane by using different group transformations, and is not limited to perform click and selection at a specific position on the base plane. Therefore, even if the area of the base plane is very large, it will not cause inconvenience to the user in operation.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
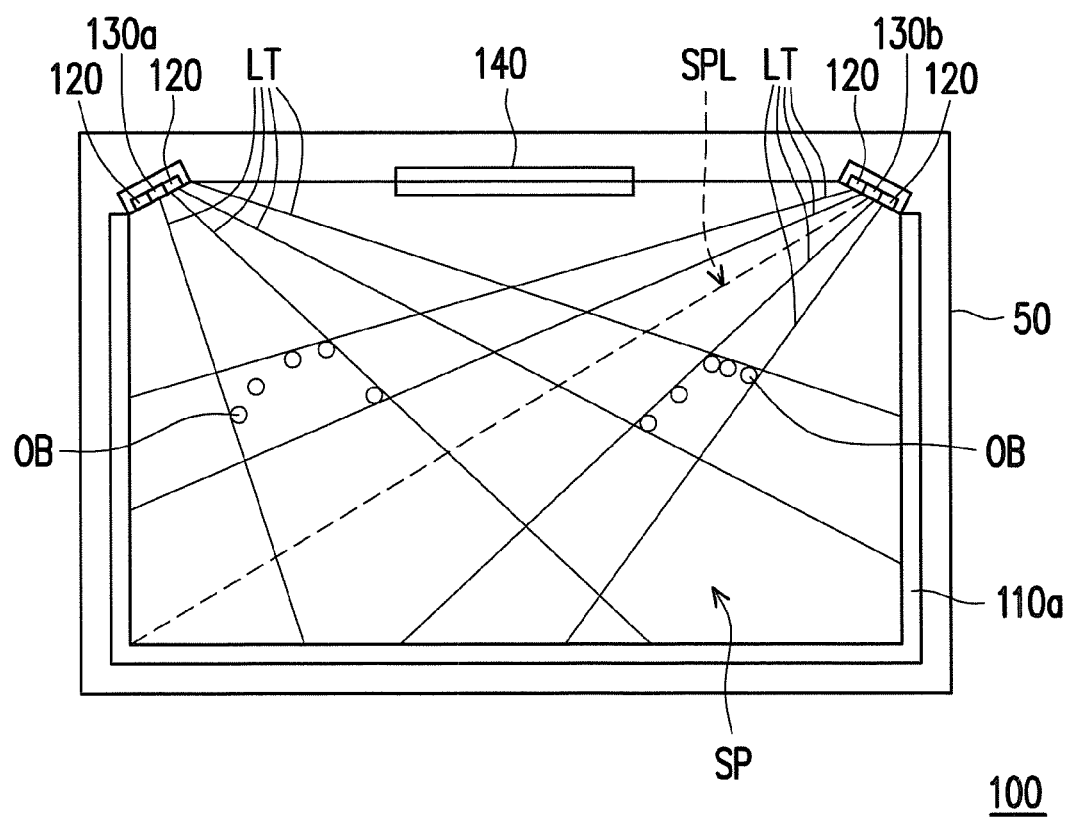
FIG. 1 is a schematic diagram of an optical touch system according to an embodiment of the disclosure.

FIG. 1 is a schematic diagram of an optical touch system according to an embodiment of the disclosure. Referring to FIG. 1, the optical touch system 100 of the present embodiment can be used to determine a group transformation when two groups of objects OB approach to or touch a base plane SP. In the present embodiment, the optical touch system 100 can be applied to a display 50, where the base plane SP is a display surface of the display 50. Alternatively, in other embodiments, the base plane SP can also be a surface of a touch platform different to the display 50, where the touch platform is, for example, a touchpad (for example, a touchpad on a keyboard of a notebook computer or a touchpad on other handheld electronic apparatus), a desktop, a wall surface or other surfaces suitable for being approached or touched by the two groups of the objects OB. In the present embodiment, the two groups of the objects OB are two hands of the user, and the group transformation is gesture transformation. The optical touch system 100 includes at least one light source 120 (a plurality of light sources 120 are illustrated in FIG. 1), a first optical sensor 130a, a second optical sensor 130b and a processing unit 140. The at least one light source 120 is disposed at a side of the base plane SP and emits a light beam LT towards the base plane SP. The light source 120 can include a light emitting diode (LED), a laser, etc. that is suitable for emitting a detection light. The first optical sensor 130a is disposed at a side of the base plane SP, and detects a space in front of the base plane SP to generate a first signal S1. The second optical sensor 130b is disposed at a side of the base plane SP, and detects the space in front of the base plane SP to generate a second signal S2, where a position of the first optical sensor 130a is different to a position of the second optical sensor 130b. Each of the first optical sensor 130a and the second optical sensor 130b can include an image sensor such as a charge coupled device (CCD) or a complementary metal-oxide semiconductor (CMOS) sensor, though the disclosure is not limited thereto. The processing unit 140 receives the first signal S1 and the second signal S2, where when the two groups of the objects OB approach to or touch the base plane SP, the processing unit 140 determines at least one first portion of the first signal S1 corresponding to the two groups of the objects OB and at least one second portion of the second signal S2 corresponding to the two groups of the objects OB according to a clustering algorithm, and the processing unit 140 converts the at least one first portion and the at least one second portion into a plurality of possible touch regions in a two-dimensional (2D) space according to a triangulation. Moreover, the processing unit 140 determines a group transformation according to positions corresponding to at least a part of the possible touch regions. In this way, the processing unit 140 can execute a corresponding operation instruction according to the group transformation. Moreover, in the present embodiment, the optical touch system 100 includes a plurality of light dispersion bars 110a.

The optical touch system 100 is a reflective optical touch system, and the light dispersion bars 110a are respectively disposed corresponding to a plurality of sides of the base plane SP, and touch positions corresponding to approaching or touching of the two groups of the objects OB in the first signal S1 and the second signal S2 correspond to positions where the light beam LT detected at a first detection position and a second detection position is reflected by the two groups of the objects OB. The first signal S1 and the second signal S2 are illustrated and described later. Moreover, it should be noticed that in the following embodiments, the optical touch system 100 is a reflective type optical touch system, and in other embodiments, the optical touch system 100 can be a blocking type optical touch system, though the disclosure is not limited thereto.

In detail, in other embodiments, reflective bars can be used to replace the light dispersion bars 110a, and the optical touch system 100 is the blocking optical touch system, where positions of the reflective bars are the same as the positions of the light dispersion bars 110a. Namely, the reflective bars are respectively disposed corresponding to a plurality of sides of the base plane SP. The touch positions corresponding to approaching or touching of the two groups of the objects OB in the first signal S1 and the second signal S2 correspond to positions where the light beam LT detected at the first detection position and the second detection position is blocked by the two groups of the objects OB. When none of the two groups of the objects OB approach to or touch the base plane SP, the first optical sensor 130a generates the first signal S1 corresponding to the light beam LT, where an intensity of the first signal S1 is not zero, and the second optical sensor 130b generates the second signal S2 corresponding to the light beam LT, where an intensity of the second signal S2 is not zero. When the two groups of the objects OB approach to or touch the base plane SP, the first signal S1 corresponding to the first optical sensor 130a includes a depression of the signal intensity of the at least one first portion corresponding to the two groups of the objects OB, and the second signal S2 corresponding to the second optical sensor 130b includes a depression of signal intensity of the at least one second portion corresponding to the two groups of the objects OB.

Figure 2A:
FIG. 2A and FIG. 2B are schematic diagrams of a first signal and a second signal detected by a first optical sensor and a second optical sensor of the embodiment of FIG. 1.
Figure 2B:
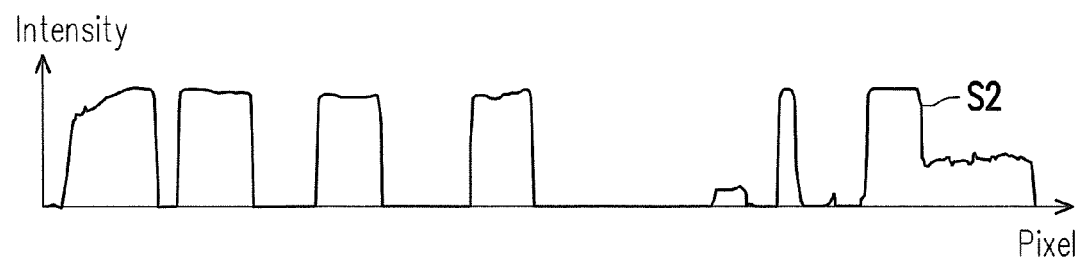
Figure 2C:
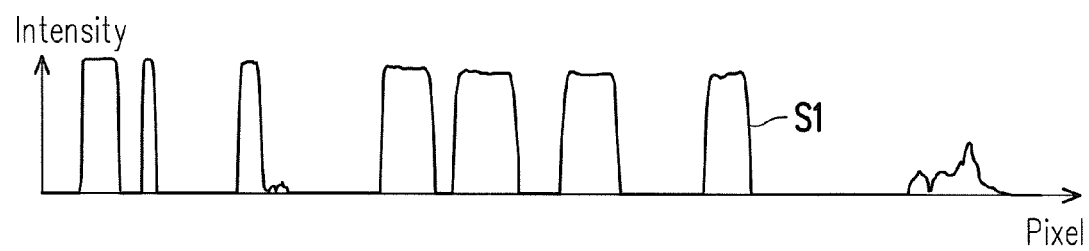
FIG. 2C and FIG. 2D are schematic diagrams of a first signal and a second signal detected by a first optical sensor and a second optical sensor after a predetermined time according to another embodiment of the disclosure.
Figure 2D:
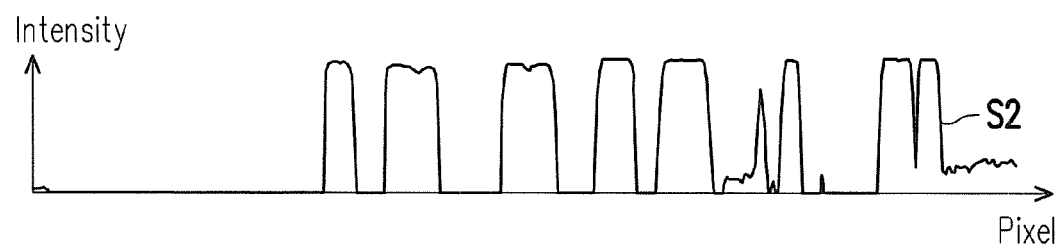

FIG. 2A and FIG. 2B are schematic diagrams of the first signal and the second signal detected by the first optical sensor and the second optical sensor of the embodiment of FIG. 1, and FIG. 2C and FIG. 2D are schematic diagrams of the first signal and the second signal detected by the first optical sensor and the second optical sensor after a predetermined time according to another embodiment of the disclosure. Referring to FIG. 1, FIG. 2A and FIG. 2B, in detail, in the present embodiment, when none of the two groups of the objects OB approach to or touch the base plane SP, the first optical sensor 130a generates the first signal S1 corresponding to the light beam LT, where an intensity of the first signal S1 is zero or is smaller than a threshold, and the second optical sensor 130b generates the second signal S2 corresponding to the light beam LT, where an intensity of the second signal S2 is also zero or is smaller than a threshold. When the two groups of the objects OB approach to or touch the base plane SP, the first signal S1 corresponding to the first optical sensor 130a includes a protrusion of the signal intensity of the at least one first portion corresponding to the two groups of the objects OB, and the second signal S2 corresponding to the second optical sensor 130b includes a protrusion of signal intensity of the at least one second portion corresponding to the two groups of the objects OB. In the present embodiment, the at least one first portion in the first signal S1 corresponding to the two groups of the objects OB is a plurality of first portions, the at least one second portion in the second signal S2 corresponding to the two groups of the objects OB is a plurality of second portions, and signal intensities of the first portions and the second portions are greater than zero, as that shown in FIG. 2A, where horizontal axes in FIG. 2A and FIG. 2C represent detection angles of the first optical sensor 130a, and horizontal axes of FIG. 2B and FIG. 2D represent detection angles of the second optical sensor 130b, where a range of the detection angles may cover the base plane SP along a direction of a reference line SPL. Horizontal axes represent intensities of the signals detected by the first optical sensor 130a and the second optical sensor 130b, i.e. intensities of lights detected by the first optical sensor 130a and the second optical sensor 130b.

Referring to FIG. 2C to FIG. 2D, in the present embodiment, after the predetermined time, when the two groups of the object OB approach to or touch the base plane SP, the first signal S1 corresponding to the first optical sensor 130a includes the at least one first portion corresponding to the two groups of the objects OB, and the second signal S2 corresponding to the second optical sensor 130b includes the at least one second portion corresponding to the two groups of the objects OB. In the present embodiment, the at least one first portion in the first signal S1 corresponding to the two groups of the objects OB is a plurality of first portions, the at least one second portion in the second signal S2 corresponding to the two groups of the objects OB is a plurality of second portions, and signal intensities of the first portions and the second portions are greater than zero, as that shown in FIG. 2C and FIG. 2D.

Figure 3A:
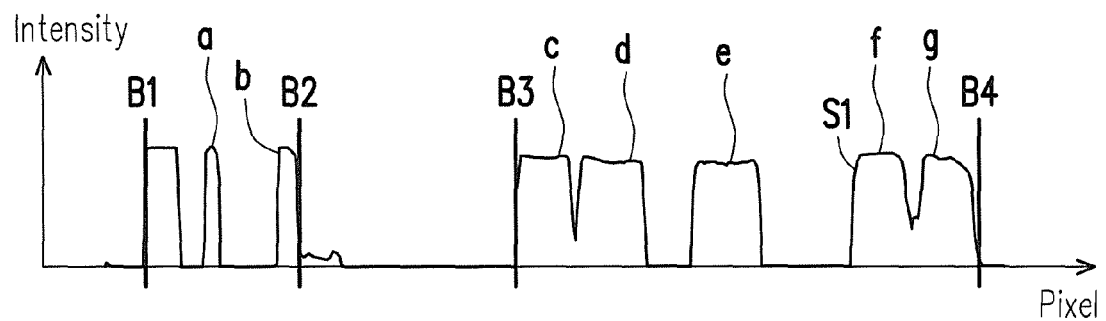
FIG. 3A and FIG. 3B are schematic diagrams of a first signal S1 and a second signal S2 detected by a first optical sensor 130a and a second optical sensor 130b according to another embodiment of the disclosure.
Figure 3B:
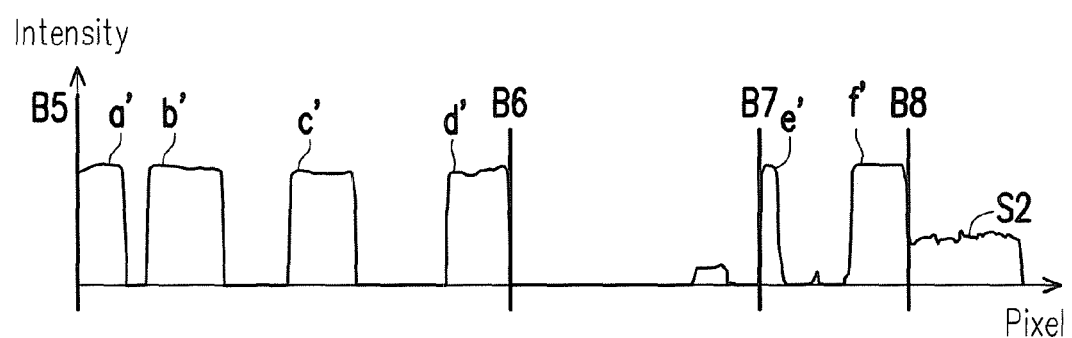
Figure 3C:
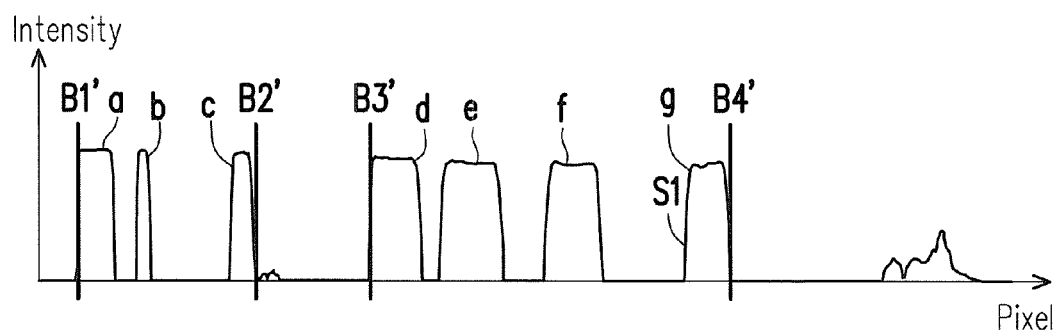
FIG. 3C and FIG. 3D are schematic diagrams of the first signal S1 and the second signal S2 detected by the first optical sensor 130a and the second optical sensor 130b according to still another embodiment of the disclosure.
Figure 3D:
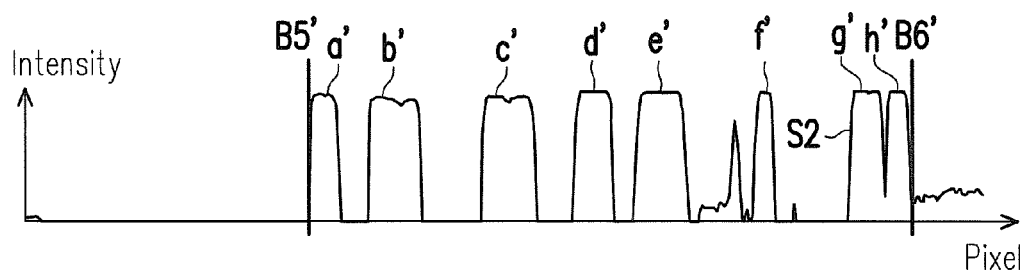

FIG. 3A and FIG. 3B are schematic diagrams of the first signal S1 and the second signal S2 detected by the first optical sensor 130a and the second optical sensor 130b according to another embodiment of the disclosure, and FIG. 3C and FIG. 3D are schematic diagrams of the first signal S1 and the second signal S2 detected by the first optical sensor 130a and the second optical sensor 130b according to still another embodiment of the disclosure. Referring to FIG. 3A and FIG. 3B, in the present embodiment, the processing unit 140 can calculate approaching or touching positions of the two groups of the objects OB on the base plane SP according to positions of the intensities of the first portions in the first signal S1 corresponding to the two groups of the objects OB and positions of the intensities of the second portions in the second signal S2 corresponding to the two groups of the objects OB. Moreover, the processing unit 140 determines whether the number of the approaching or touching positions of the two groups of the objects OB on the base plane SP is greater than or equal to 5, and if yes, the processing unit 140 determines that the two groups of the objects OB approach to or touch the base plane SP, and executes the clustering algorithm. In detail, in the present embodiment, referring to FIG. 3A, the processing unit 140 calculates the approaching or touching positions of the two groups of the objects OB on the base plane SP according to positions of the intensities of the first portions in the first signal S1 corresponding to the two groups of the objects OB, and determines whether the number of the approaching or touching positions of the two groups of the objects OB on the base plane SP is greater than or equal to 5. In the present embodiment, when the number of the approaching or touching positions of the two groups of the objects OB on the base plane SP is greater than 5, the processing unit 140 determines that the two groups of the objects OB approach to or touch the base plane SP, and executes the clustering algorithm. In the present embodiment, the clustering algorithm is a k-means clustering algorithm, which is capable of clustering the positions of the intensities of the first portions in the first signal S1 and the second signal S2 corresponding to the two groups of the objects OB. In other embodiments, the other clustering algorithms can also be used, such as the improved k-means clustering algorithm or a k-th nearest neighbor algorithm, which is not limited by the disclosure. In the present embodiment, since relative distances between the positions of the intensities of the first portions in the first signal S1 corresponding to the two groups of the objects OB are different, the result obtained according to the clustering algorithm can be one of one group or two groups. In the present embodiment, the processing unit 140 clusters the intensities of the first portions in the first signal S1 corresponding to the two groups of the objects OB into two groups according to the clustering algorithm, and intensities of boundaries of the first portions corresponding to the two groups of the objects OB are defined to be a quarter of a maximum value of the intensities of the first portions. For example, as that shown in FIG. 3A, the processing unit 140 clusters the first portions in the first signal S1 corresponding to the two groups of the objects OB into two groups according to the clustering algorithm, where boundaries of one of the groups are a boundary B1 and a boundary B2, and boundaries of the other one of the groups are a boundary B3 and a boundary B4. In other embodiments, an intensity of the boundary can be defined as three-quarter of the maximum value of the intensities of the first portions or other values, which is not limited by the disclosure. Referring to FIG. 3B, in the present embodiment, the second portions in the second signal S2 corresponding to the two groups of the objects OB are clustered into two groups according to the clustering algorithm, where boundaries of one of the groups are a boundary B5 and a boundary B6, and boundaries of the other one of the groups are a boundary B7 and a boundary B8. Definition of the boundaries is the same as that of FIG. 3A, which is not repeated.

Moreover, referring to FIG. 3C and FIG. 3D, in another embodiment, FIG. 3C illustrates a plurality of first portions in the first signal S1 corresponding to the two groups of the objects OB, and the first portions are clustered into two groups by the processing unit 140 according to the clustering algorithm, where boundaries of one of the groups are a boundary B1' and a boundary B2', and boundaries of the other one of the groups are a boundary B3' and a boundary B4'. FIG. 3D illustrates a plurality of second portions in the second signal S2 corresponding to the two groups of the objects OB, and the second portions are clustered into one group by the processing unit 140 according to the clustering algorithm, where boundaries of the group are a boundary B5' and a boundary B6'.

Figure 4A:
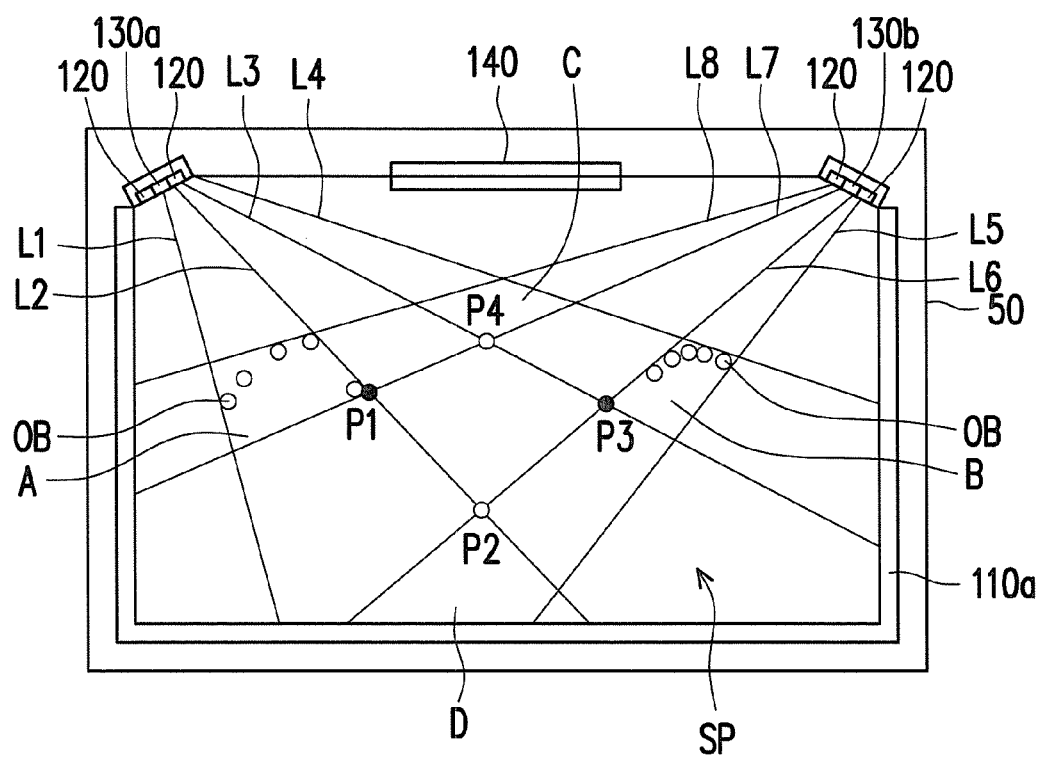
FIG. 4A and FIG. 4B are schematic diagrams of the optical touch system according to the embodiment of FIG. 1.
Figure 4B:
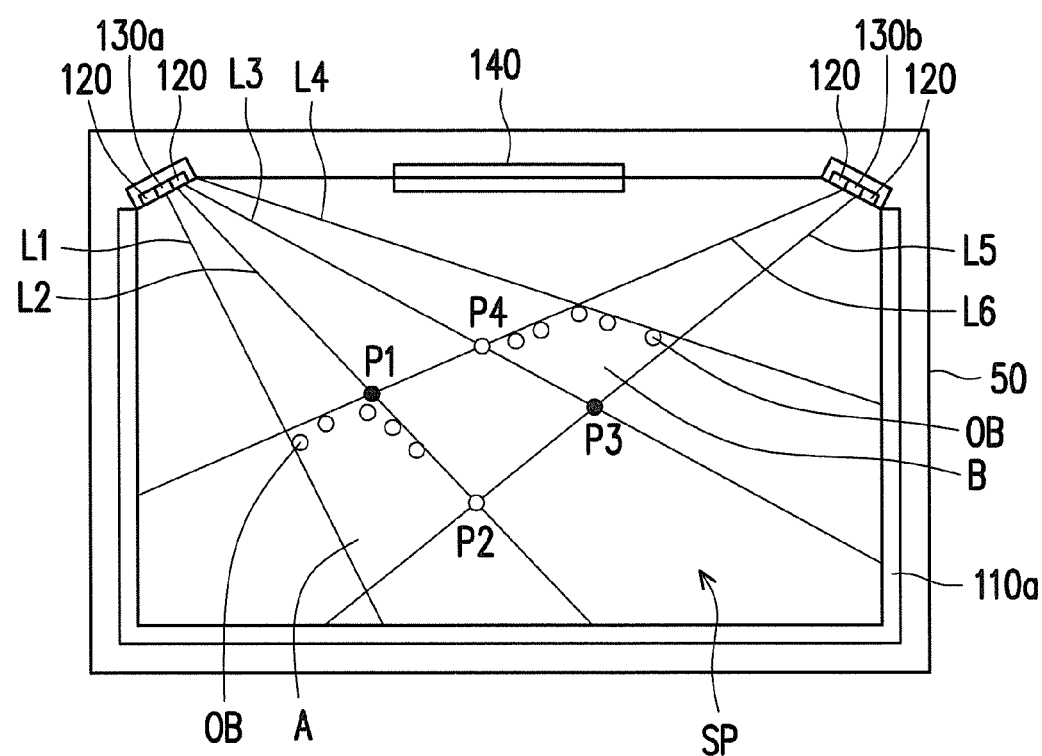

FIG. 4A and FIG. 4B are schematic diagrams of the optical touch system according to the embodiment of FIG. 1. Referring to FIG. 3A, FIG. 3B and FIG. 4A, in the present embodiment, when the two groups of the objects OB approach to or touch the base plane SP, the first optical sensor 130a detects the two groups of the objects OB in front of the base plane SP to generate the first signal S1, and the second optical sensor 130b detects the two groups of the objects OB in front of the base plane SP to generate the second signal S2, and the processing unit 140 determines a plurality of first portions of the first signal S1 corresponding to the two groups of the objects OB and a plurality of second portions of the second signal S2 corresponding to the two groups of the objects OB according to the clustering algorithm. In detail, referring to FIG. 3A and FIG. 4A, in the present embodiment, FIG. 4A illustrates two light sources 120 located to the left and to the right, where the light source 120 located to the upper left of the base plane SP corresponds to the first optical sensor 130a located to the upper left of the base plane SP, and the first optical sensor 130a detects positions where the light beam LT is blocked or reflected (the light beam LT is reflected in the present embodiment) by the two groups of the objects OB. As that shown in FIG. 4A, one of the two groups of the objects OB is located at a region between a light beam L1 and a light beam L2, and the other one of the two groups of the objects OB is located at a region between a light beam L3 and a light beam L4. In detail, the boundary B1 of the first signal S1 corresponds to the light beam L1 detected by the first optical sensor 130a, the boundary B2 of the first signal S1 corresponds to the light beam L2 detected by the first optical sensor 130a, the boundary B3 of the first signal S1 corresponds to the light beam L3 detected by the first optical sensor 130a, and the boundary B4 of the first signal S1 corresponds to the light beam L4 detected by the first optical sensor 130a. Moreover, referring to FIG. 3B and FIG. 4A, the light source 120 located to the upper right of the base plane SP corresponds to the second optical sensor 130b located to the upper right of the base plane SP, and the second optical sensor 130b detects positions where the light beam LT is blocked by the two groups of the objects OB. In the present embodiment, one of the two groups of the objects OB is located at a region between a light beam L5 and a light beam L6, and the other one of the two groups of the objects OB is located at a region between a light beam L7 and a light beam L8. In detail, the boundary B5 of the second signal S2 corresponds to the light beam L5 detected by the second optical sensor 130b, the boundary B6 of the second signal S2 corresponds to the light beam L6 detected by the second optical sensor 130b, the boundary B7 of the second signal S2 corresponds to the light beam L7 detected by the second optical sensor 130b, and the boundary B8 of the second signal S2 corresponds to the light beam L8 detected by the second optical sensor 130b.

Further, referring to FIG. 3A, FIG. 3B and FIG. 4A, in the present embodiment, regarding the first portions in the first signal S1 corresponding to the two groups of the objects OB, the first portions are, for example, a first portion a to a first portion g, as that shown in FIG. 3A, and the processing unit 140 converts the first portion a to the first portion g into a plurality of positions in a possible touch region A to a possible touch region D according to a triangulation. Regarding the second portions in the second signal S2 corresponding to the two groups of the objects OB, the second portions are, for example, a second portion a' to a second portion f, as that shown in FIG. 3B, and the processing unit 140 converts the second portion a' to the second portion f into a plurality of positions in the possible touch region A to the possible touch region D according to the triangulation, as that shown in FIG. 4A. Moreover, referring to FIG. 4A, in the present embodiment, an intersection of the light beam L2 and the light beam L7 is a vertex P1, an intersection of the light beam L2 and the light beam L6 is a vertex P2, an intersection of the light beam L3 and the light beam L6 is a vertex P3, and an intersection of the light beam L3 and the light beam L7 is a vertex P4. The vertex P1, the vertex P2, the vertex P3 and the vertex P4 construct an area K.

In another embodiment, referring to FIG. 3B and FIG. 4B, in the present embodiment, when the two groups of the objects OB approach to or touch the base plane SP, the first optical sensor 130a detects the two groups of the objects OB in front of the base plane SP to generate the first signal S1, and the second optical sensor 130b detects the two groups of the objects OB in front of the base plane SP to generate the second signal S2. In the present embodiment, the processing unit 140 clusters the first portions in the first signal S1 corresponding to the two groups of the objects OB into two groups according to the clustering algorithm, and the processing unit 140 clusters the second portions in the second signal S2 corresponding to the two groups of the objects OB into one group according to the clustering algorithm, and boundaries thereof are the boundary B5' and the boundary B6'. Moreover, the second optical sensor 130b detects positions where the light beam L1 to the light beam L6 are blocked by the two groups of the objects OB, and in the present embodiment, one of the two groups of the objects OB is located at a region between the light beam L5 and the light beam L6, and the other one of the two groups of the objects OB is also located at the region between the light beam L5 and the light beam L6. In detail, the boundary B5' of the second signal S2 corresponds to the light beam L5 detected by the second optical sensor 130b, and the boundary B6 of the second signal S2 corresponds to the light beam L6 detected by the second optical sensor 130b.

Further, referring to FIG. 3C, FIG. 3D and FIG. 4B, in detail, in the present embodiment, regarding the first portions in the first signal S1 corresponding to the two groups of the objects OB, the first portions are, for example, a first portion a to a first portion g, as that shown in FIG. 3C, and the processing unit 140 converts the first portion a to the first portion g into a plurality of positions in the possible touch region A to the possible touch region D according to the triangulation. Regarding the second portions in the second signal S2 corresponding to the two groups of the objects OB, the second portions are, for example, a second portion a' to a second portion h', as that shown in FIG. 3D, and the processing unit 140 converts the second portion a' to the second portion h' into a plurality of positions in the possible touch region A to the possible touch region B according to the triangulation, as that shown in FIG. 4B.

Figure 5A:
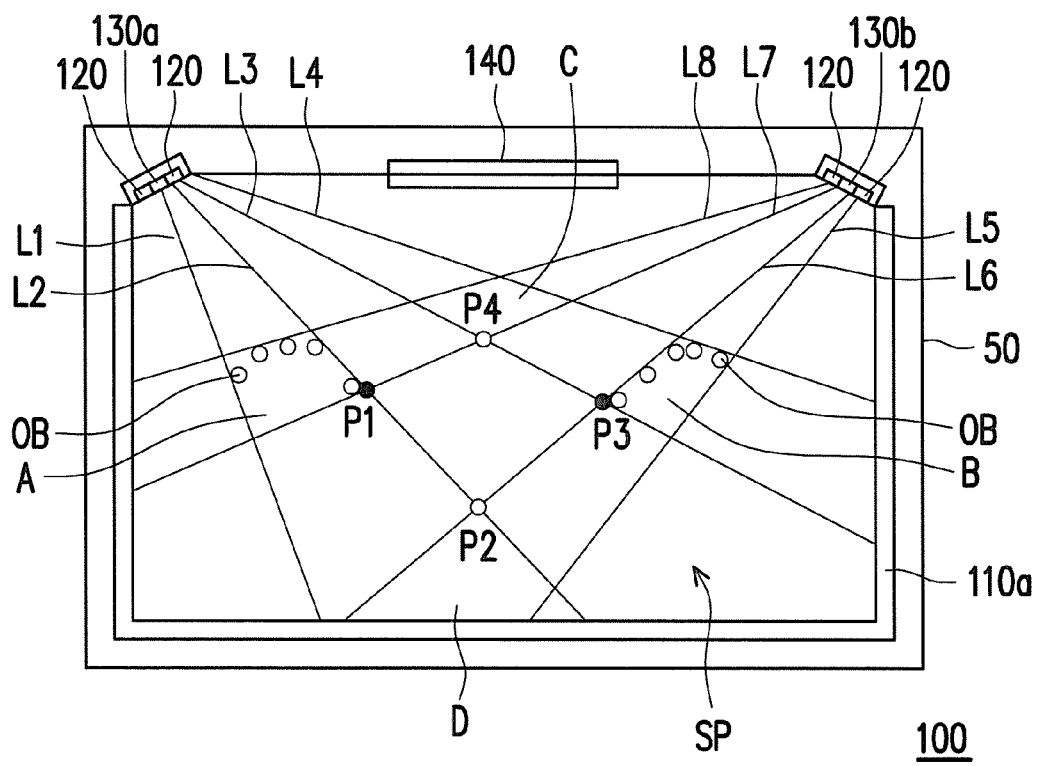
FIG. 5A is a schematic diagram of an optical touch system according to an embodiment of the disclosure.
Figure 5B:
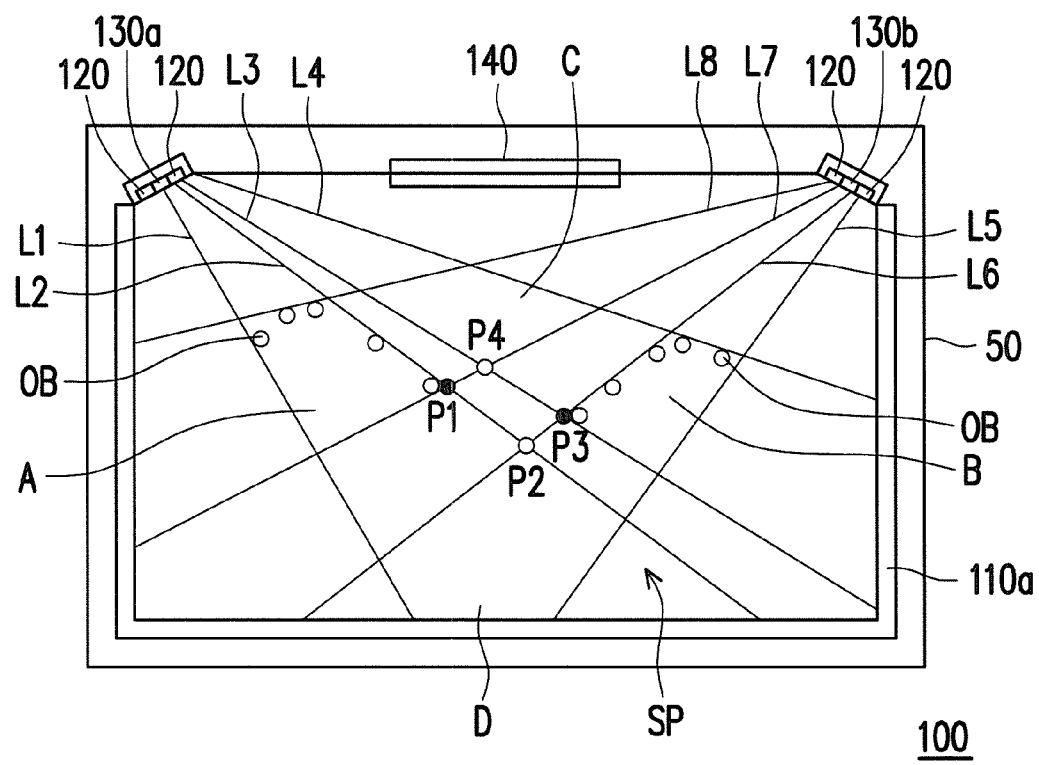
FIG. 5B is a schematic diagram of the optical touch system of the embodiment of FIG. 5A.

FIG. 5A is a schematic diagram of an optical touch system according to an embodiment of the disclosure, and FIG. 5B is a schematic diagram of the optical touch system of the embodiment of FIG. 5A. Referring to FIG. 5A and FIG. 5B, in the present embodiment, the optical touch systems 100 illustrated in FIG. 5A and FIG. 5B are the same optical touch system 100 in different time points, where a state of the optical touch system 100 of FIG. 5A is prior to a state of the optical touch system 100 of FIG. 5B in timing. In detail, when the possible touch regions A, B, C and D in the optical touch system 100 shown in FIG. 5A and FIG. 5B all move and approach to each other, or when the adjacent vertexes P1, P2, P3 and P4 of the possible touch regions A, B, C and D move and the area K encircled by the vertexes P1, P2, P3 and P4 is decreased, the processing unit 140 determines the group transformation as that the two groups of the objects OB approach to each other. Moreover, when the possible touch regions A, B, C and D in the optical touch system 100 shown in FIG. 5A and FIG. 5B all move and depart from each other, or when the adjacent vertexes P1, P2, P and P4 of the possible touch regions A, B, C and D move and the area K encircled by the vertexes P1, P2, P3 and P4 is increased, the processing unit 140 determines the group transformation as that the two groups of the objects OB depart from each other. In the present embodiment, the two groups of the objects OB are the two hands of the user, and the group transformation is gesture transformation, and the processing unit 140 executes a corresponding operation instruction according to the group transformation. For example, when the two hands of the user approach to each other, the processing unit 140 determines the group transformation as that the two groups of the objects OB approach to each other, and executes the corresponding operation instruction according to the group transformation that the two groups of the objects OB approach to each other, where the operation instruction is, for example, to zoom out a photo played by a display 50. In other embodiments, the operation instruction is, for example, to zoom in the photo played by the display 50 or other functions customized by the user, which is not limited by the disclosure. The user can implement the required operations at any position in front of the base plane by using different group transformations, and is not limited to perform click and selection at a specific position on the base plane. Therefore, even if the area of the base plane is very large, it will not cause inconvenience to the user in operation.

Figure 6A:
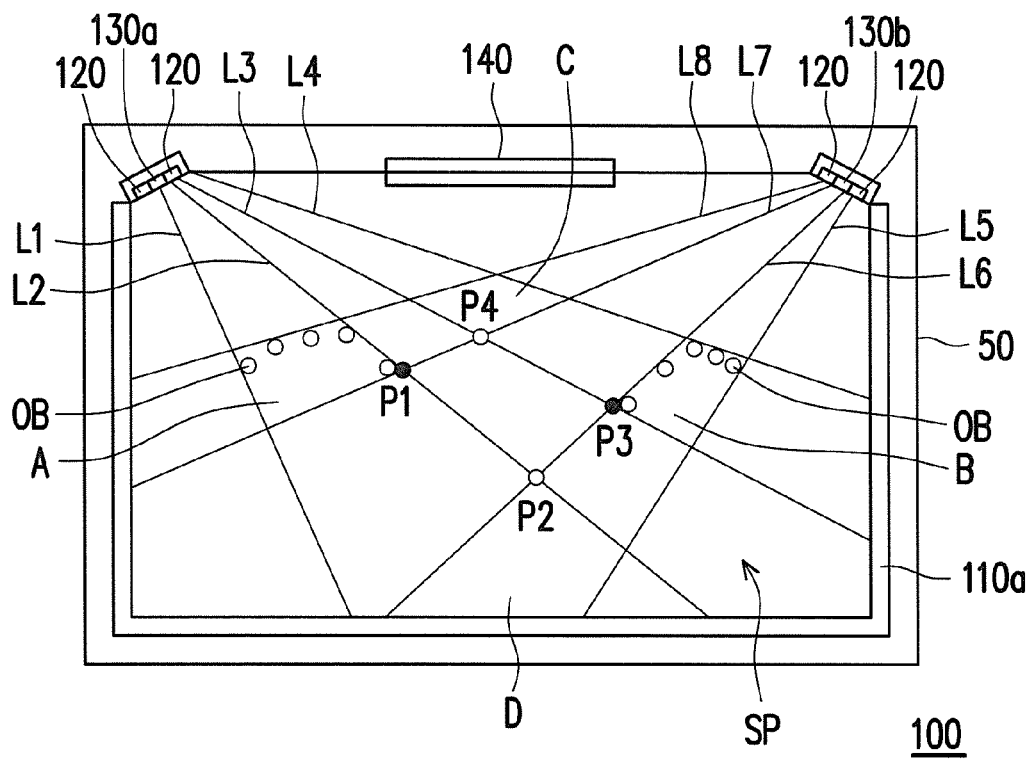
FIG. 6A is a schematic diagram of an optical touch system according to another embodiment of the disclosure.
Figure 6B:
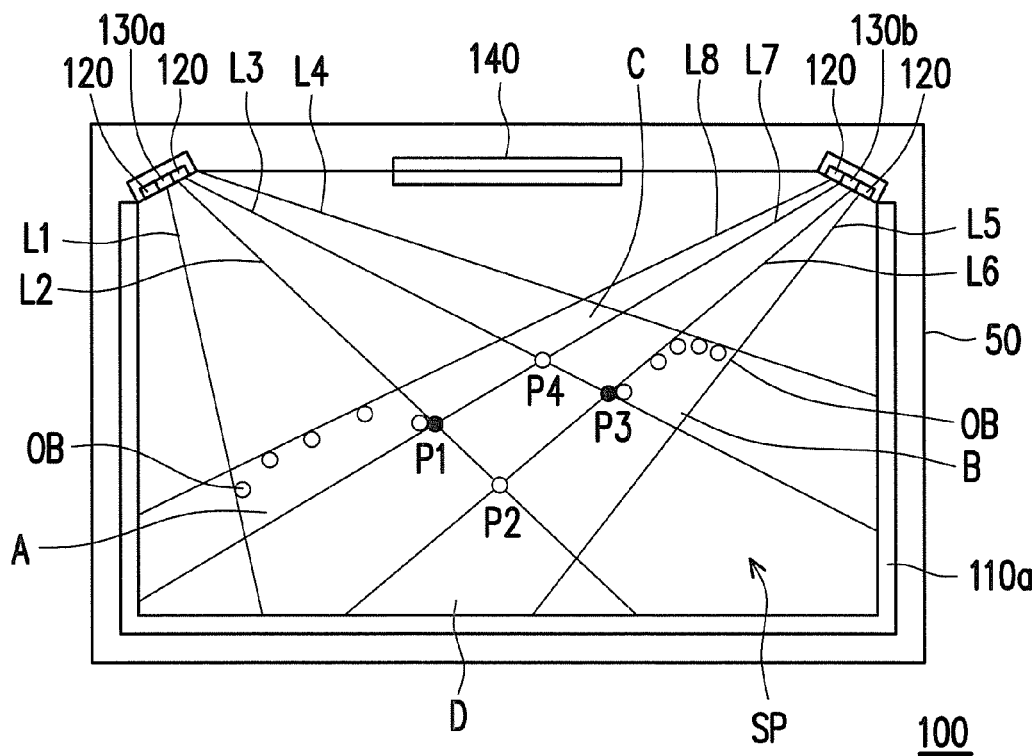
FIG. 6B is a schematic diagram of the optical touch system of the embodiment of FIG. 6A.

FIG. 6A is a schematic diagram of an optical touch system according to another embodiment of the disclosure, and FIG. 6B is a schematic diagram of the optical touch system of the embodiment of FIG. 6A. Referring to FIG. 6A and FIG. 6B, in the present embodiment, the optical touch systems 100 illustrated in FIG. 6A and FIG. 6B are the same optical touch system 100 in different time points, where a state of the optical touch system 100 of FIG. 6A is prior to a state of the optical touch system 100 of FIG. 6B in timing. When one of the possible touch regions A, B, C and D (for example, the possible touch region B in the present embodiment) is stationary and the others move, or when one of the adjacent vertexes P1, P2, P3 and P4 (for example, the vertex P3 in the present embodiment) of the possible touch regions A, B, C and D is stationary and the others move, the processing unit 140 determines the group transformation as that one of the two groups of the objects OB is stationary and the other one moves. In the present embodiment, the group of the objects OB located in the possible touch region B is stationary, and the group of the objects OB located in the possible touch region A moves, and the processing unit 140 executes a corresponding operation instruction according to the group transformation of the two groups of the objects OB. For example, the two groups of the objects OB are the two hands of the user, and when one of the two hands of the user (for example, the right hand in the present embodiment) is stationary, and the other one of the two hands of the user (for example, the left hand in the present embodiment) moves downwards, the processing unit 140 executes an operation instruction corresponding to such group transformation, where the operation instruction is, for example, to fix the objects located in the possible touch region B in the display 50 and move the objects located in the possible touch region A in the display 50. In other embodiments, the operation instruction can be other functions customized by the user, which is not limited by the disclosure. In this way, the user can implement the required operations at any position in front of the base plane by using different group transformations, and is not limited to perform click and selection at a specific position on the base plane. Therefore, even if the area of the base plane is very large, it will not cause inconvenience to the user in operation.

Figure 7A:
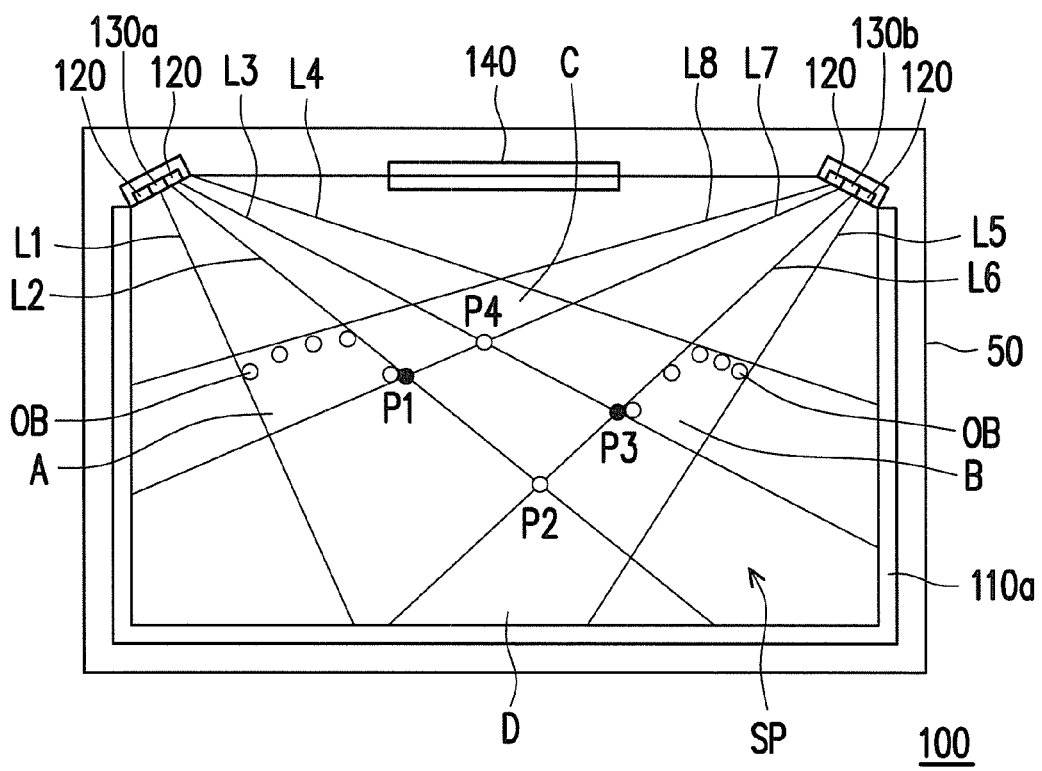
FIG. 7A is a schematic diagram of an optical touch system according to another embodiment of the disclosure.
Figure 7B:
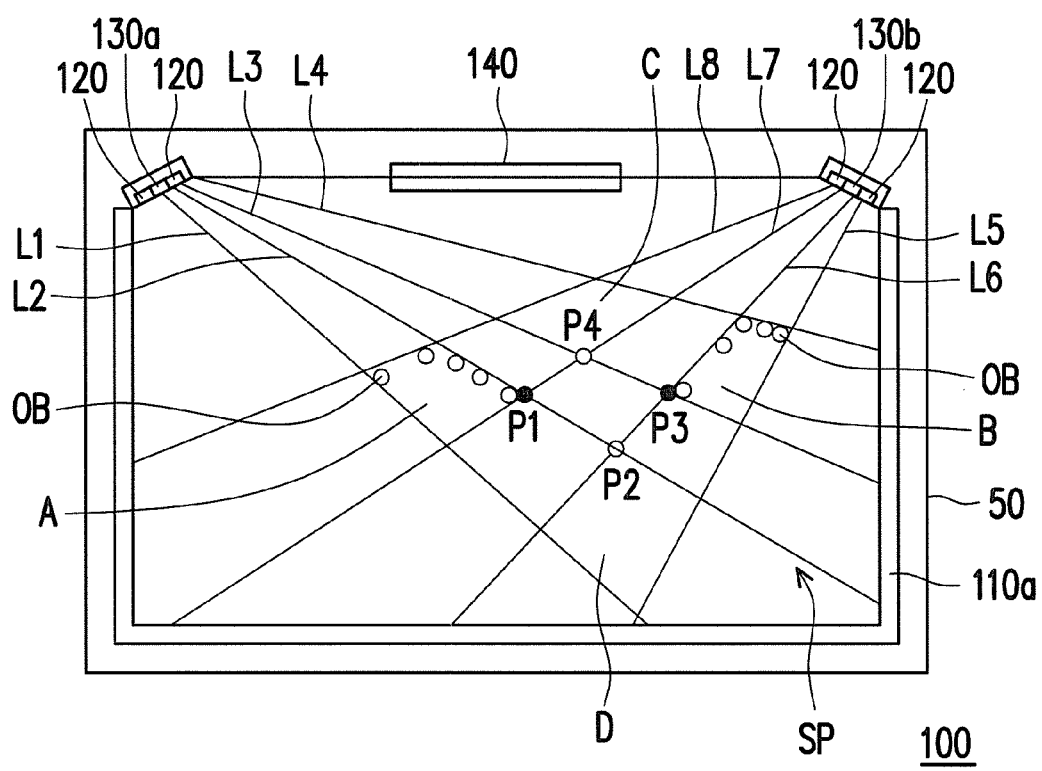
FIG. 7B is a schematic diagram of the optical touch system of the embodiment of FIG. 7A.

FIG. 7A is a schematic diagram of an optical touch system according to another embodiment of the disclosure, and FIG. 7B is a schematic diagram of the optical touch system of the embodiment of FIG. 7A. Referring to FIG. 7A and FIG. 7B, in the present embodiment, the optical touch systems 100 illustrated in FIG. 7A and FIG. 7B are the same optical touch system 100 in different time points, where a state of the optical touch system 100 of FIG. 7A is prior to a state of the optical touch system 100 of FIG. 7B in timing. When the possible touch regions A, B, C and D all move towards a substantially same direction, or when the adjacent vertexes P1, P2, P3 and P4 of the possible touch regions A, B, C and D move towards the substantially same direction, the processing unit 140 determines the group transformation as that the two groups of the objects OB move towards the same direction, and the processing unit 140 executes a corresponding operation instruction according to the group transformation of the two groups of the objects OB. For example, the two groups of the objects OB are the two hands of the user, and the two hands move towards a same direction. In the present embodiment, the two groups of the objects OB all move towards a right side of the base plane SP, and in other embodiments, the two groups of the objects OB may all move downwards relative to the base plane SP, or move towards other directions relative to the base plane SP, which is not limited by the disclosure. The processing unit 140 executes an operation instruction corresponding to the group transformation, and the operation instruction is, for example, to move the objects located in the possible touch region A and the possible touch region B in the display 50 towards a same direction. In other embodiments, the operation instruction can be other functions customized by the user, which is not limited by the disclosure.

Figure 8A:
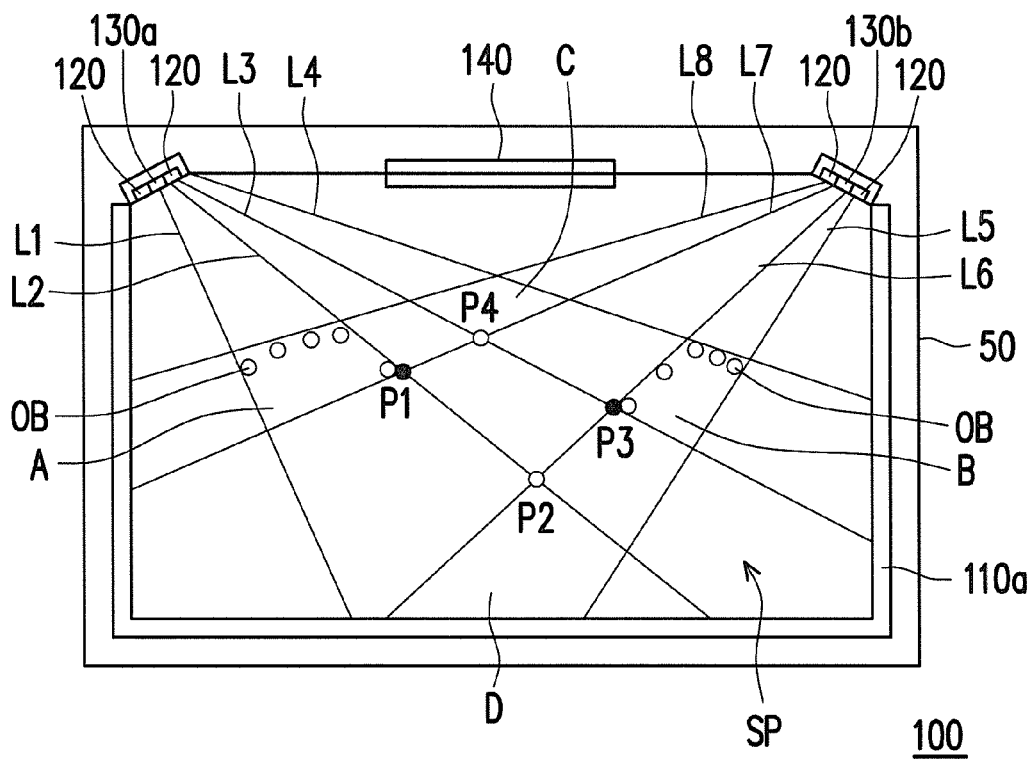
FIG. 8A is a schematic diagram of an optical touch system according to still another embodiment of the disclosure.
Figure 8B:
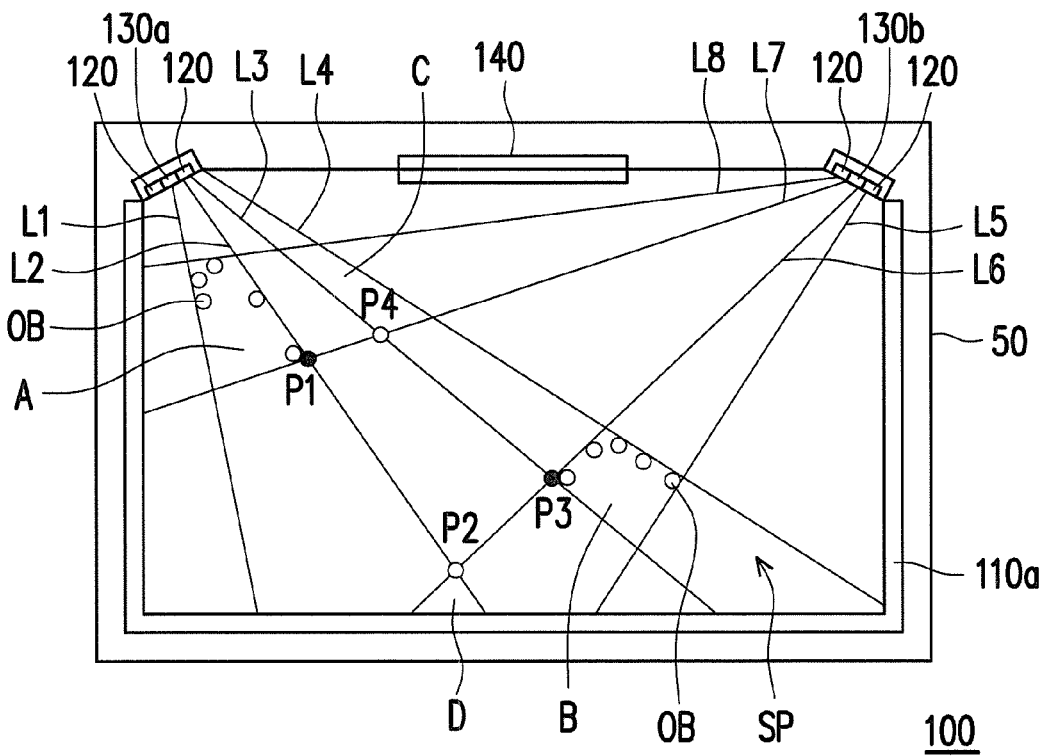
FIG. 8B is a schematic diagram of the optical touch system of the embodiment of FIG. 8A.

FIG. 8A is a schematic diagram of an optical touch system according to still another embodiment of the disclosure, and FIG. 8B is a schematic diagram of the optical touch system of the embodiment of FIG. 8A. Referring to FIG. 8A and FIG. 8B, in the present embodiment, the optical touch systems 100 illustrated in FIG. 8A and FIG. 8B are the same optical touch system 100 in different time points, where a state of the optical touch system 100 of FIG. 8A is prior to a state of the optical touch system 100 of FIG. 8B in timing. The processing unit 140 regards a part of the possible touch regions A, B, C and D with a smaller difference of side lengths as real touch regions, and regards the other part of the possible touch regions A, B, C and D with a larger difference of side lengths as fake touch regions. In the present embodiment, the side lengths of the possible touch region A and the possible touch region B have a smaller difference, so that the possible touch region A and the possible touch region B are regarded as the real touch regions. The side lengths of the possible touch region C and the possible touch region D have a larger difference, so that the possible touch region C and the possible touch region D are regarded as the fake touch regions. Moreover, when the real touch regions (for example, the possible touch region A and the possible touch region B) move clockwise or anticlockwise, the processing unit 140 determines the group transformation as that the two groups of the objects OB rotate clockwise or anticlockwise. For example, the two groups of the objects OB are the two hands of the user, and the two hands rotate clockwise, the possible touch region A moves upwards relative to the base plane SP, the possible touch region B moves downwards relative to the base plane SP, the possible touch region C moves towards the right side of the base plane SP, and the possible touch region D moves towards the left side of the base plane SP. In another embodiment, the two groups of the touch objects OB are the two hands of the user, and the two hands rotate anticlockwise, the possible touch region A moves downwards relative to the base plane SP, the possible touch region B moves upwards relative to the base plane SP, the possible touch region C moves towards the left side of the base plane SP, and the possible touch region D moves towards the right side of the base plane SP. The processing unit 140 executes an operation instruction corresponding to the group transformation, and the operation instruction is, for example, to rotate the objects located in the possible touch region A and the possible touch region B in the display 50 clockwise or anticlockwise. In other embodiments, the operation instruction can be other functions customized by the user, which is not limited by the disclosure.

Figure 9:
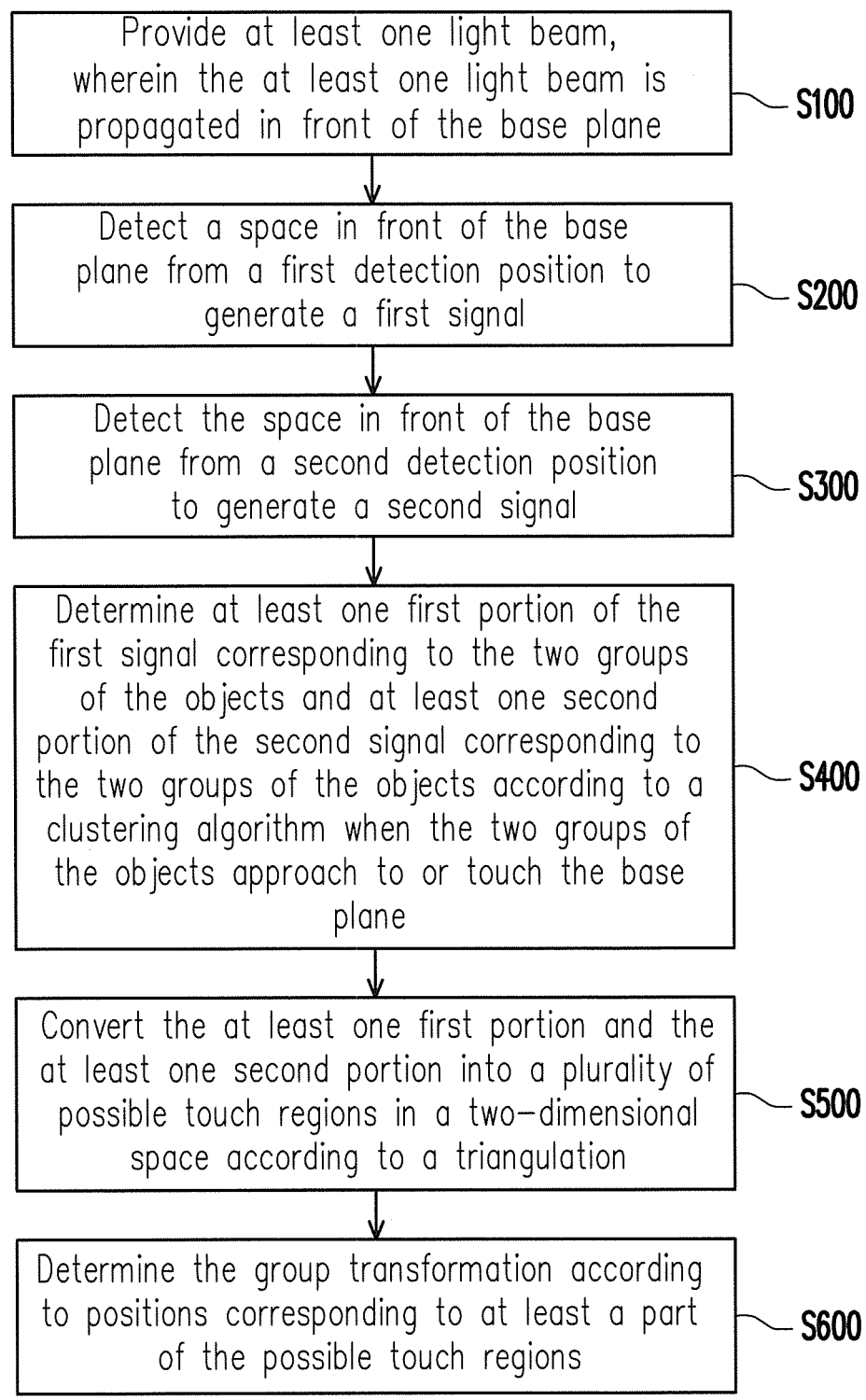
FIG. 9 is a flowchart illustrating a method of touch detection according to an embodiment of the disclosure.

FIG. 9 is a flowchart illustrating a method of touch detection according to an embodiment of the disclosure. Referring to FIG. 9, the method of touch detection can be used determine a group transformation when the two groups of the objects OB approach to or touch the base plane SP, and the method can be executed by the optical touch systems shown in FIG. 1 to FIG. 6 to implement following steps. At least one light beam is provided, and the at least one light beam is propagated in front of the base plane SP (step S100). A space in front of the base plane SP is detected from a first detection position to generate a first signal S1. The space in front of the base plane SP is detected from a second detection position to generate a second signal S2 (step S200). When the two groups of the objects OB approach to or touch the base plane SP, at least one first portion of the first signal S1 corresponding to the two groups of the objects OB and at least one second portion of the second signal S2 corresponding to the two groups of the objects OB are determined according to a clustering algorithm (step S300). The at least one first portion and the at least one second portion are converted into a plurality of possible touch regions in a two-dimensional space according to a triangulation (step S400). A group transformation is determined according to positions corresponding to at least a part of the possible touch regions (step S500). Similar to the embodiments of FIG. 1 to FIG. 8, different group transformations of the two groups of the objects may activate different functions. In this way, different functions can be activated through gesture transformations of the two hands.

Moreover, the method of touch detection further includes executing a corresponding operation instruction according to the group transformation, where the two groups of the objects OB are the two hands of the user, and the group transformation is a gesture transformation. Further, the method of touch detection further includes following steps. It is determined whether the number of the approaching or touching positions of the two groups of the objects OB on the base plane SP is greater than or equal to 5, and if yes, it is determined that the two groups of the objects OB approach to or touch the base plane SP, and the clustering algorithm is executed. The apparatus used for executing the aforementioned steps and detailed descriptions thereof may refer to the embodiments of FIG. 1 to FIG. 8, which are not repeated.

In detail, in the method of touch detection, the step of determining the group transformation according to the positions corresponding to at least a part of the possible touch regions includes following steps. When the possible touch regions all move and approach to each other or depart from each other, or when a plurality of adjacent vertexes of the possible touch regions moves and the area encircled by the vertexes is decreased or increased, the group transformation is determined as that the two groups of the objects OB approach to each other or depart from each other. Alternatively, when one of the possible touch regions is stationary and the others move, or when one of the adjacent vertexes of the possible touch regions is stationary and the others move, the group transformation is determined as that one of the two groups of the objects OB is stationary and the other group moves. The apparatus used for executing the aforementioned steps and detailed descriptions thereof may refer to the embodiments of FIG. 1 to FIG. 8, which are not repeated.

Further, in the method of touch detection, the step of determining the group transformation according to the positions corresponding to at least a part of the possible touch regions includes a following step. When the possible touch regions all move towards a substantially same direction, or when the adjacent vertexes of the possible touch regions move towards the substantially same direction, the group transformation is determined as that the two groups of the objects OB move towards the same direction.

Moreover, the method of touch detection further includes regarding a part of the possible touch regions with a smaller difference of side lengths as real touch regions, and regarding the other part of the possible touch regions with a larger difference of side lengths as fake touch regions. In this way, the step of determining the group transformation according to the positions corresponding to at least a part of the possible touch regions includes a following step. When the real touch regions move clockwise or anticlockwise, the group transformation is determined as that the two groups of the objects OB rotate clockwise or anticlockwise. The apparatus used for executing the aforementioned steps and detailed descriptions thereof may refer to the embodiments of FIG. 1 to FIG. 8, which are not repeated.

In the present embodiment, the touching positions corresponding to approaching or touching of the two groups of the objects OB in the first signal S1 and the second signal S2 correspond to positions where the light beam detected at a first detection position and a second detection position is blocked or reflected by the two groups of the objects OB.

Figure 10:
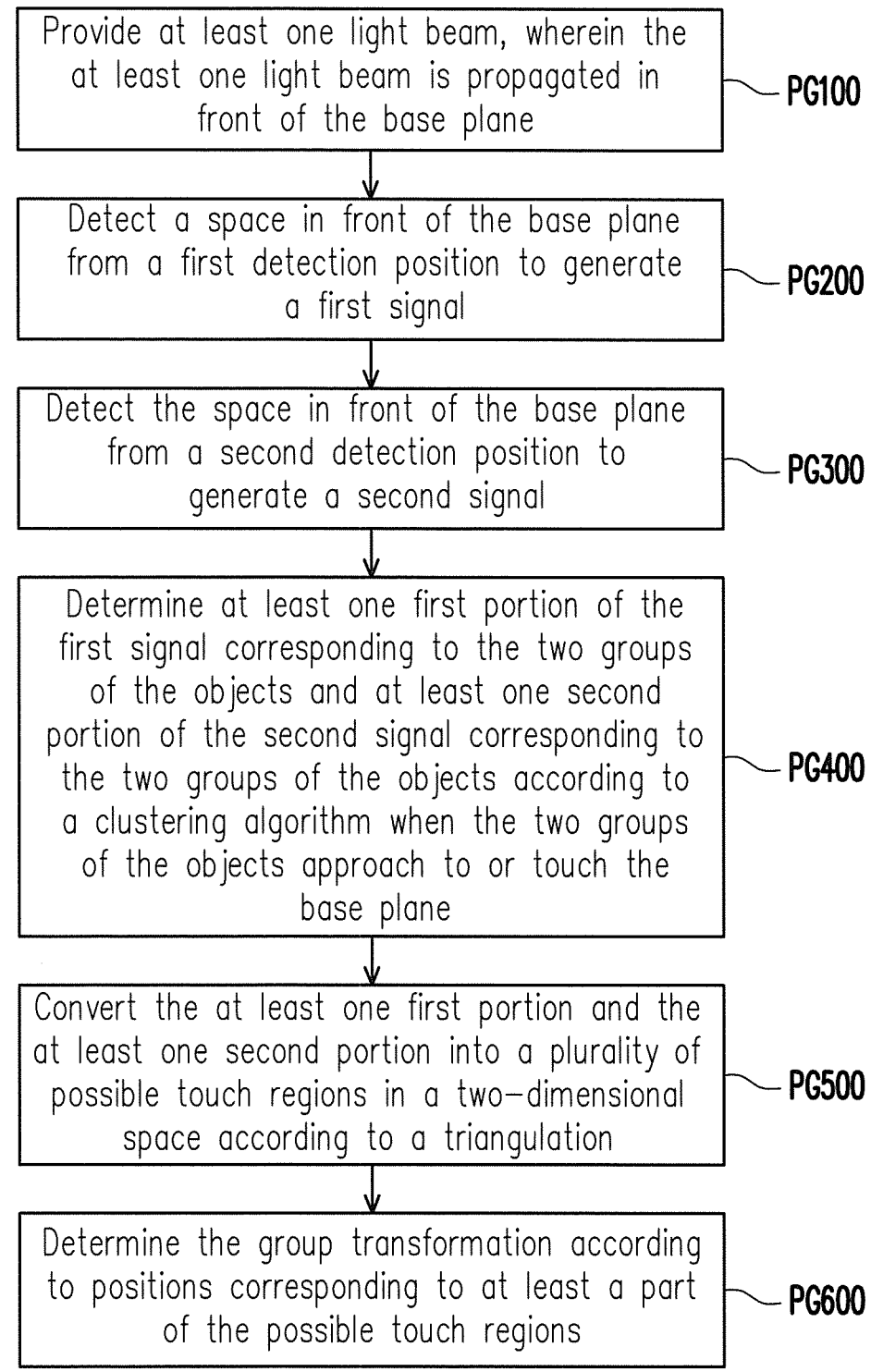
FIG. 10 is a flowchart illustrating an instruction flow of a computer program product according to an embodiment of the disclosure.

FIG. 10 is a flowchart illustrating an instruction flow of a computer program product according to an embodiment of the disclosure. Referring to FIG. 10, the computer program product is adapted to be stored in a computer readable recording medium for determining a group transformation when the two groups of the objects OB approach to or touch a base plane SP. In the present embodiment, the computer program product can be loaded into the processing unit 140 of FIG. 1 to execute following program instructions. The computer program product includes a first program instruction (PG100) including providing at least one light beam, where the at least one light beam is propagated in front of the base plane SP; a second program instruction (PG200) including detecting a space in front of the base plane SP from a first detection position to generate a first signal S1; a third program instruction (PG300) including detecting the space in front of the base plane SP from a second detection position to generate a second signal S2; a fourth program instruction (PG400) including determining at least one first portion of the first signal S1 corresponding to the two groups of the objects OB and at least one second portion of the second signal S2 corresponding to the two groups of the objects OB according to a clustering algorithm when the two groups of the objects OB approach to or touch the base plane SP; a fifth program instruction (PG500) including converting the at least one first portion and the at least one second portion into a plurality of possible touch regions in a two-dimensional space according to a triangulation; and a sixth program instruction (PG600) including determining a group transformation according to positions corresponding to at least a part of the possible touch regions. The first, the second, the third, the fourth, the fifth and the sixth program instructions are only used to facilitate describing the disclosure, and the execution sequence of the program instructions is not limited thereto. Moreover, the apparatus used for executing the aforementioned program instructions and detailed descriptions thereof may refer to the embodiments of FIG. 1 to FIG. 8, which are not repeated.

In the present embodiment, the computer program product includes executing a corresponding program instruction according to the group transformation, where the two groups of the objects OB are the two hands of the user, and the group transformation is a gesture transformation. Moreover, the computer program product further includes determining whether the number of the approaching or touching positions of the two groups of the objects OB on the base plane SP is greater than or equal to 5, and if yes, it is determined that the two groups of the objects OB approach to or touch the base plane SP, and the clustering algorithm is executed. The apparatus used for executing the aforementioned program instructions and detailed descriptions thereof may refer to the embodiments of FIG. 1 to FIG. 8, which are not repeated.

In detail, in the present embodiment, the sixth program instruction includes a following step: when the possible touch regions all move and approach to each other or depart from each other, or when a plurality of vertexes of the possible touch regions moves and the area encircled by the vertexes is decreased or increased, the group transformation is determined as that the two groups of the objects OB approach to each other or depart from each other. Alternatively, when one of the possible touch regions is stationary and the others move, or when one of the adjacent vertexes of the possible touch regions is stationary and the others move, the group transformation is determined as that one of the two groups of the objects OB is stationary and the other group moves. The apparatus used for executing the aforementioned program instructions and detailed descriptions thereof may refer to the embodiments of FIG. 1 to FIG. 8, which are not repeated.

In the present embodiment, the sixth program instruction includes a following step: when the possible touch regions all move towards a substantially same direction, or when the adjacent vertexes of the possible touch regions move towards the substantially same direction, the group transformation is determined as that the two groups of the objects OB move towards the same direction. The apparatus used for executing the aforementioned program instructions and detailed descriptions thereof may refer to the embodiments of FIG. 1 to FIG. 8, which are not repeated.

Moreover, the computer program product further includes regarding a part of the possible touch regions with a smaller difference of side lengths as real touch regions, and regarding the other part of the possible touch regions with a larger difference of side lengths as fake touch regions. In detail, the sixth program instruction includes a following step: when the real touch regions move clockwise or anticlockwise, the group transformation is determined as that the two groups of the objects OB rotate clockwise or anticlockwise. The apparatus used for executing the aforementioned steps and detailed descriptions thereof may refer to the embodiments of FIG. 1 to FIG. 8, which are not repeated. Moreover, in the present embodiment, the touching positions corresponding to approaching or touching of the two groups of the objects OB in the first signal S1 and the second signal S2 correspond to positions where the light beam detected at a first detection position and a second detection position is blocked or reflected by the two groups of the objects OB.

In summary, in the optical touch system of the disclosure, the first optical sensor and the second optical sensor are used to detect the space in front of the base plane to generate the first signal and the second signal, and the processing unit determines at least one first portion of the first signal corresponding to the two groups of the objects and at least one second portion of the second signal corresponding to the two groups of the objects according to the clustering algorithm, and converts the at least one first portion and the at least one second portion into a plurality of possible touch regions in a two-dimensional space according to the triangulation, and the processing unit determines a group transformation according to positions corresponding to at least a part of the possible touch regions, such that different group transformations of the two groups of the objects can activate different functions. In this way, the user can implement required operations at any position in front of the base plane by using different group transformations, and is not limited to perform click and selection at a specific position on the base plane. Therefore, even if the area of the base plane is very large, it will not cause inconvenience to the user in operation. According to the method of touch detection of the disclosure, the first optical sensor and the second optical sensor are used to detect the space in front of the base plane to generate the first signal and the second signal, and the processing unit determines at least one first portion of the first signal corresponding to the two groups of the objects and at least one second portion of the second signal corresponding to the two groups of the objects according to the clustering algorithm, and converts the at least one first portion and the at least one second portion into a plurality of possible touch regions in the two-dimensional space according to the triangulation, and the processing unit determines a group transformation according to positions corresponding to at least a part of the possible touch regions, such that different group transformations of the two groups of the objects can activate different functions. In this way, the user can implement required operations at any position in front of the base plane by using different group transformations, and is not limited to perform click and selection at a specific position on the base plane. Therefore, even if the area of the base plane is very large, it will not cause inconvenience to the user in operation. According to the computer program product of the disclosure, the first optical sensor and the second optical sensor are controlled to detect the space in front of the base plane to generate the first signal and the second signal, and the processing unit determines at least one first portion of the first signal corresponding to the two groups of the objects and at least one second portion of the second signal corresponding to the two groups of the objects according to the clustering algorithm, and converts the at least one first portion and the at least one second portion into a plurality of possible touch regions in the two-dimensional space according to the triangulation, and the processing unit determines a group transformation according to positions corresponding to at least a part of the possible touch regions, such that different group transformations of the two groups of the objects can activate different functions. In this way, different functions can be activated through gesture transformations of the two hands. Therefore, the user can implement required operations at any position in front of the base plane by using different group transformations, and is not limited to perform click and selection at a specific position on the base plane. Therefore, even if the area of the base plane is very large, it will not cause inconvenience to the user in operation.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An optical touch system, configured to determine a group transformation when two groups of objects approach to or touch a base plane, the optical touch system comprising:
    at least one light source, disposed at a side of the base plane, and emitting a light beam towards the base plane;
    a first optical sensor, disposed at a side of the base plane, and detecting a space in front of the base plane to generate a first signal;
    a second optical sensor, disposed at a side of the base plane, and detecting the space in front of the base plane to generate a second signal, wherein a position of the first optical sensor is different to a position of the second optical sensor; and
    a processing unit, receiving the first signal and the second signal, wherein when the two groups of the objects approach to or touch the base plane, the processing unit determines at least one first portion of the first signal corresponding to the two groups of the objects and at least one second portion of the second signal corresponding to the two groups of the objects, the processing unit converts the at least one first portion and the at least one second portion into a plurality of possible touch regions in a two-dimensional space, and the processing unit determines the group transformation according to positions corresponding to at least a part of the possible touch regions,
    wherein the processing unit determines whether the number of approaching or touching positions of the two groups of the objects on the base plane is greater than or equal to 5, and if yes, the processing unit determines that the two groups of the objects approach to or touch the base plane, and determines the at least one first portion of the first signal corresponding to the two groups of the objects and the at least one second portion of the second signal corresponding to the two groups of the objects by using a clustering algorithm.

2. The optical touch system as claimed in claim 1, wherein the processing unit executes a corresponding operation instruction according to the group transformation.

3. The optical touch system as claimed in claim 1, wherein the two groups of the objects are two hands, and the group transformation is a gesture transformation.

4. The optical touch system as claimed in claim 1, wherein when the possible touch regions all move and approach to each other or depart from each other, or when a plurality of adjacent vertexes of the possible touch regions moves and an area encircled by the vertexes is decreased or increased, the processing unit determines the group transformation as that the two groups of the objects approach to each other or depart from each other.

5. The optical touch system as claimed in claim 1, wherein when one of the possible touch regions is stationary and the others move, or when one of a plurality of adjacent vertexes of the possible touch regions is stationary and the others move, the processing unit determines the group transformation as that one of the two groups of the objects is stationary and the other group moves.

6. The optical touch system as claimed in claim 1, wherein when the possible touch regions all move towards a substantially same direction, or when a plurality of adjacent vertexes of the possible touch regions moves towards the substantially same direction, the processing unit determines the group transformation as that the two groups of the objects move towards the same direction.

7. The optical touch system as claimed in claim 1, wherein the processing unit regards a part of the possible touch regions with a smaller difference of side lengths as real touch regions, and regards the other part of the possible touch regions with a larger difference of the side lengths as fake touch regions.

8. The optical touch system as claimed in claim 7, wherein when the real touch regions move clockwise or anticlockwise, the processing unit determines the group transformation as that the two groups of the objects rotate clockwise or anticlockwise.

9. The optical touch system as claimed in claim 7, wherein touching positions corresponding to approaching or touching of the two groups of the objects in the first signal and the second signal correspond to positions where the light beam transmitted to the first optical sensor and the second optical sensor is blocked or reflected by the two groups of the objects.

10. A method of touch detection, configured to determine a group transformation when two groups of objects approach to or touch a base plane, the method of touch detection comprising:
providing at least one light beam, wherein the at least one light beam is propagated in front of the base plane;
detecting a space in front of the base plane from a first detection position to generate a first signal;
detecting the space in front of the base plane from a second detection position to generate a second signal;
determining at least one first portion of the first signal corresponding to the two groups of the objects and at least one second portion of the second signal corresponding to the two groups of the objects when the two groups of the objects approach to or touch the base plane;
converting the at least one first portion and the at least one second portion into a plurality of possible touch regions in a two-dimensional space;
determining the group transformation according to positions corresponding to at least a part of the possible touch regions; and
determining whether the number of approaching or touching positions of the two groups of the objects on the base plane is greater than or equal to 5, and if yes, determining that the two groups of the objects approach to or touch the base plane, and determining the at least one first portion of the first signal corresponding to the two groups of the objects and the at least one second portion of the second signal corresponding to the two groups of the objects by using a clustering algorithm.

11. The method of touch detection as claimed in claim 10, further comprising executing a corresponding operation instruction according to the group transformation.

12. The method of touch detection as claimed in claim 10, wherein the two groups of the objects are two hands, and the group transformation is a gesture transformation.

13. The method of touch detection as claimed in claim 10, wherein the step of determining the group transformation according to positions corresponding to at least a part of the possible touch regions comprises:
determining the group transformation as that the two groups of the objects approach to each other or depart from each other when the possible touch regions all move and approach to each other or depart from each other, or when a plurality of adjacent vertexes of the possible touch regions moves and an area encircled by the vertexes is decreased or increased.

14. The method of touch detection as claimed in claim 10, wherein when one of the possible touch regions is stationary and the others move, or when one of a plurality of adjacent vertexes of the possible touch regions is stationary and the others move, the group transformation is determined as that one of the two groups of the objects is stationary and the other group moves.

15. The method of touch detection as claimed in claim 10, wherein when the possible touch regions all move towards a substantially same direction, or when a plurality of adjacent vertexes of the possible touch regions moves towards the substantially same direction, the group transformation is determined as that the two groups of the objects move towards the same direction.

16. The method of touch detection as claimed in claim 10, further comprising regarding a part of the possible touch regions with a smaller difference of side lengths as real touch regions, and regarding the other part of the possible touch regions with a larger difference of the side lengths as fake touch regions.

17. The method of touch detection as claimed in claim 16, wherein when the real touch regions move clockwise or anticlockwise, the group transformation is determined as that the two groups of the objects rotate clockwise or anticlockwise.

18. The method of touch detection as claimed in claim 10, wherein touching positions corresponding to approaching or touching of the two groups of the objects in the first signal and the second signal correspond to positions where the light beam detected at the first detection position and the second detection position is blocked or reflected by the two groups of the objects.

19. A computer program product, stored in a non-transitory computer readable storage medium for determining a group transformation when two groups of objects approach to or touch a base plane, the computer program product comprising:
a first program instruction for providing at least one light beam, wherein the at least one light beam is propagated in front of the base plane;
a second program instruction for detecting a space in front of the base plane from a first detection position to generate a first signal;
a third program instruction for detecting the space in front of the base plane from a second detection position to generate a second signal;
a fourth program instruction for determining at least one first portion of the first signal corresponding to the two groups of the objects and at least one second portion of the second signal corresponding to the two groups of the objects according to a clustering algorithm when the two groups of the objects approach to or touch the base plane;
a fifth program instruction for converting the at least one first portion and the at least one second portion into a plurality of possible touch regions in a two-dimensional space according to a triangulation; and
a sixth program instruction for determining the group transformation according to positions corresponding to at least a part of the possible touch regions.

20. The computer program product as claimed in claim 19, further comprising a program instruction for executing a corresponding operation instruction according to the group transformation.

21. The computer program product as claimed in claim 19, wherein the two groups of the objects are two hands, and the group transformation is a gesture transformation.

22. The computer program product as claimed in claim 19, further comprising a program instruction for determining whether the number of approaching or touching positions of the two groups of the objects on the base plane is greater than or equal to 5, and if yes, determining that the two groups of the objects approach to or touch the base plane, and executing the clustering algorithm.

23. The computer program product as claimed in claim 19, wherein the sixth program instruction comprises:
determining the group transformation as that the two groups of the objects approach to each other or depart from each other when the possible touch regions all move and approach to each other or depart from each other, or when a plurality of adjacent vertexes of the possible touch regions moves and an area encircled by the vertexes is decreased or increased.

24. The computer program product as claimed in claim 19, wherein the sixth program instruction comprises:
determining the group transformation as that one of the two groups of the objects is stationary and the other group moves when one of the possible touch regions is stationary and the others move, or when one of a plurality of adjacent vertexes of the possible touch regions is stationary and the others move.

25. The computer program product as claimed in claim 19, wherein the sixth program instruction comprises:
determining the group transformation as that the two groups of the objects move towards the same direction when the possible touch regions all move towards a substantially same direction, or when a plurality of adjacent vertexes of the possible touch regions moves towards the substantially same direction.

26. The computer program product as claimed in claim 19, further comprising a program instruction for regarding a part of the possible touch regions with a smaller difference of side lengths as real touch regions, and regarding the other part of the possible touch regions with a larger difference of the side lengths as fake touch regions.

27. The computer program product as claimed in claim 16, wherein the sixth program instruction comprises:
determining the group transformation as that the two groups of the objects rotate clockwise or anticlockwise when the real touch regions move clockwise or anticlockwise.

28. The computer program product as claimed in claim 19, wherein touching positions corresponding to approaching or touching of the two groups of the objects in the first signal and the second signal correspond to positions where the light beam detected at the first detection position and the second detection position is blocked or reflected by the two groups of the objects.

* * * * *